United States Patent Office 3,142,315

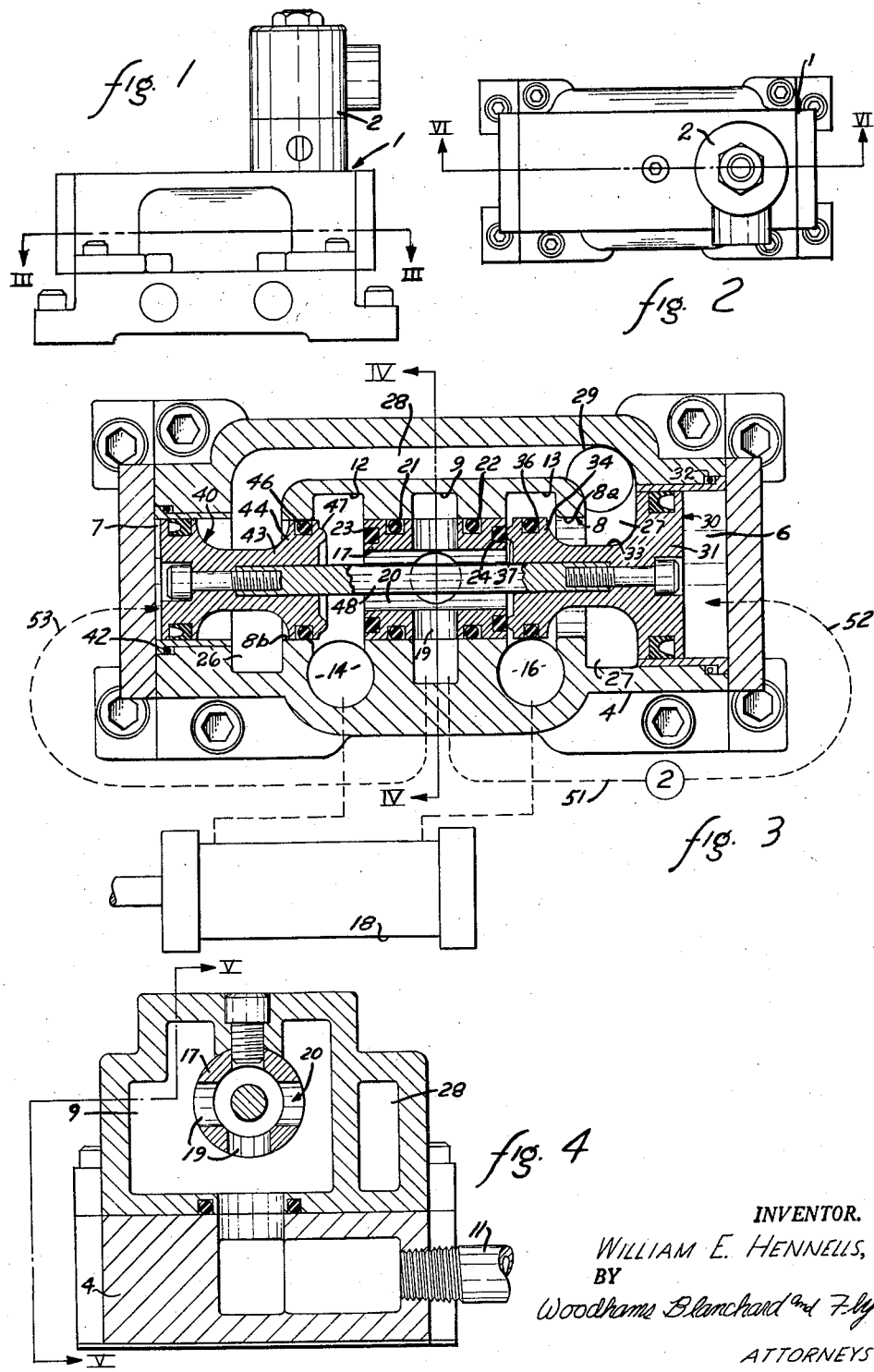

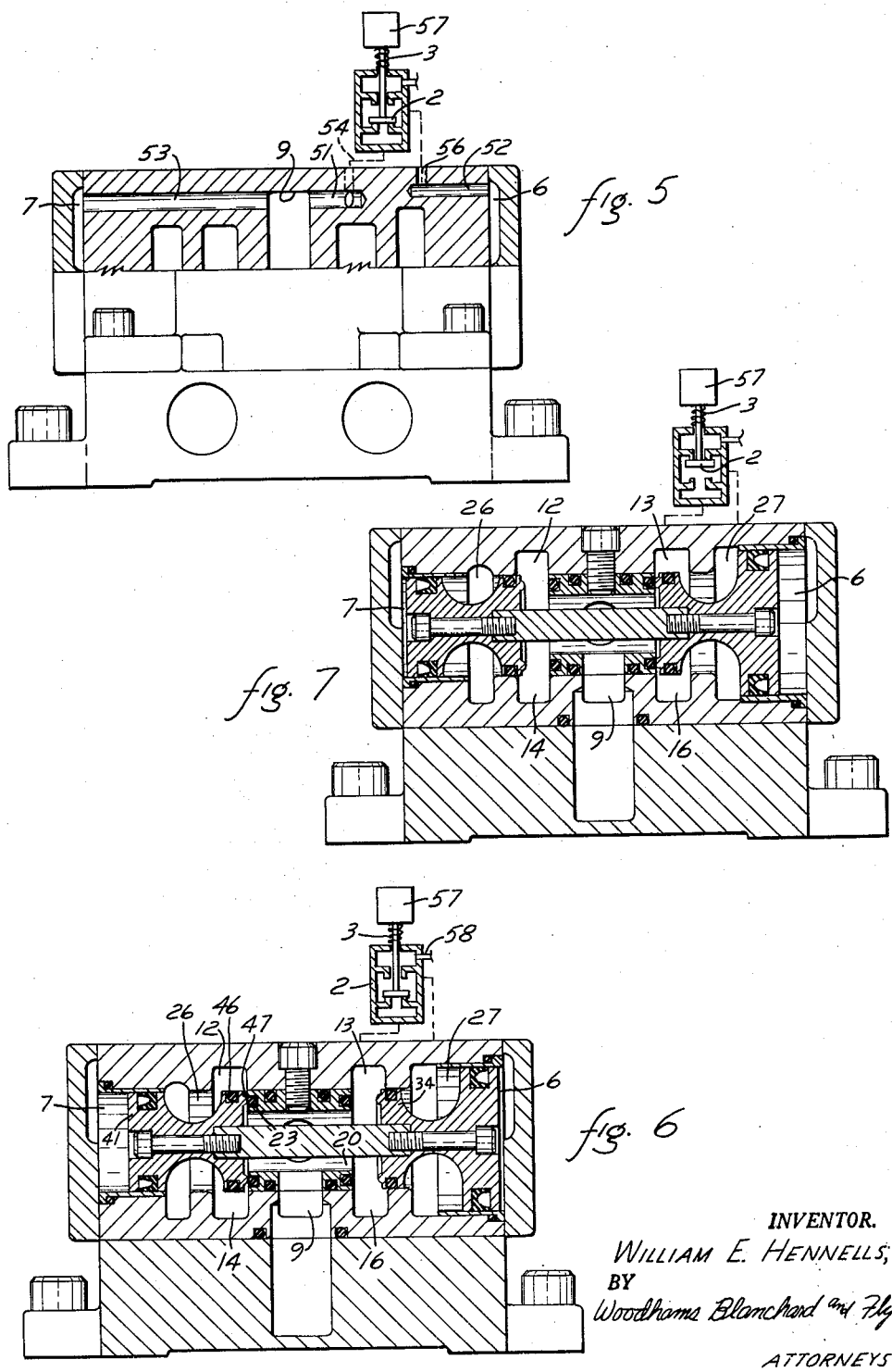

Patented July 28, 1964

3,142,315
FOUR-WAY PILOT VALVE
William E. Hennells, Sr., Ann Arbor, Mich., assignor to W. E. Hennells Co., Inc., Belleville, Mich., a corporation of Michigan
Filed July 31, 1961, Ser. No. 128,100
2 Claims. (Cl. 137—625.6)

This invention relates to a valve construction and it relates particularly to an automatically operable valve which may be connected to a fluid pressure operated cylinder for actuating same.

While a large number of automatically operable valves for controlling fluid pressure cylinders have been introduced and are at present in commercial operation, there has been a continuing need for simplification of such valves to minimize their cost without sacrificing operating reliability. Accordingly, the objects of the invention are:

(1) To provide an automatically operable valve for controlling a fluid pressure cylinder which will insure against leakage of pressure fluid between the high and low pressure parts thereof.

(2) To provide a valve, as aforesaid, which will be positive and reliable in operation, particularly by causing the valve element thereof to be shifted by the direct application of high pressure fluid thereto.

(3) To provide a valve, as aforesaid, which will be relatively simple and hence capable of economical construction.

(4) To provide a valve, as aforesaid, having a minimum of moving parts and close tolerances and hence capble of long useful life with low maintenance costs.

(5) To provide a valve, as aforesaid, wherein the effectiveness of the sealing means provided between certain of the high pressure and low pressure zones of said valve will not be diminished by reasonable wear thereof, the sealing means being self-compensating for such wear.

Other objects and purposes of the invention will be apparent to persons acquainted with devices of this general sort upon reading the following disclosure and examining the accompanying drawings.

In the drawings:

FIGURE 1 is a side elevational view of a valve made according to the invention.

FIGURE 2 is a top view of said valve.

FIGURE 3 is a sectional view taken on the line III—III of FIGURE 1.

FIGURE 4 is a sectional view taken on the line IV—IV of FIGURE 3.

FIGURE 5 is a section taken on the line V—V of FIGURE 4.

FIGURE 6 is a section taken on the line VI—VI of FIGURE 2.

FIGURE 7 is a section generally similar to FIGURE 6 but showing the parts in a different operating condition.

There is shown in FIGURE 1 a valve 1 fitted with a suitable control valve 2 which desirably is a solenoid valve biased by a spring 3 (FIGURE 6) into normally closed position. The valve 1 comprises an elongated, hollow body 4 having a first control chamber 6 at one end thereof (here the rightward end thereof as appearing in FIGURE 3), a second control chamber 7 at the other end thereof and an elongated, intermediate valve opening 8. The intermediate valve opening 8 is longitudinally aligned with and is located between the first and second control chambers 6 and 7. Here the second control chamber 7 and the valve opening 8 are of the same diameter and the first control chamber 6 is somewhat larger.

Reference will now be made to the internal passageways provided within the valve body 4. The valve body 4 has an enlarged compartment 9 which communicates with valve opening 8. The inlet 11 (FIGURE 4) supplies pressure fluid to compartment or zone 9. The valve body has further, enlarged compartments or zones 12 and 13 located on opposite sides of compartment 9 and said compartments communicate with opening 8 at axially spaced points therealong. Compartment 12 communicates with an opening 14 which is connected to one end of a cylinder 18 being controlled and compartment 13 communicates with an opening 16 connected to the other end of said cylinder.

A cylindrical sleeve 17 is disposed in opening 8 and it extends between the adjacent ends of compartments 12 and 13. The sleeve 17 has openings 19 which place the compartment 9 in communication with the central opening 20 of said sleeve. Suitable sealing means, such as O rings 21 and 22, are provided to prevent passage of fluid between the sleeve 17 and the wall of the opening 8. The opposite end faces of the sleeve 17 are provided with further sealing rings 23 and 24 which in this embodiment are of square cross section and which are substantially flush with the respective end faces of said sleeve. These rings 23 and 24 are of a resilient material, such as natural or synthetic rubber, and function as valve seats as described hereinafter.

Exhaust compartments 26 and 27 are provided at each end of the central opening 8 and are located between said opening and the chambers 7 and 6, respectively. The compartments 26 and 27 are connected to each other by a passageway 28. The passageway 28 also communicates with an exhaust port 29.

A suitable passageway indicated schematically in FIGURE 3 at 51 is provided from the inlet compartment 9 to the valve 2 and a further passageway 52 is provided from the valve 2 to the larger control chamber 6. A passageway 53 which in this embodiment is continuously opened is provided from the compartment 9 to the smaller control chamber 7. The passageways 51, 52 and 53 may be provided externally of the valve body 4 or, as shown in this embodiment, they may be provided within said body. Although these passageways do not form any part of the invention, and are shown schematically in FIGURE 3 for convenient reference, they are in this particular embodiment actually provided internally of the valve body and are shown in FIGURES 5 and 6. Referring particularly to FIGURE 5, the passageway 51 is shown as extending from the compartment 9 to a port 54 to which is affixed the valve mechanism 2 and the passageway 52 is shown as connecting a port 56, which is connected to the other side of said valve 2, with the chamber 6. The passageway 53 is shown as directly connecting the compartment 9 with the control chamber 7. The valve 2 is schematically shown as connecting the ports 54 and 56 and in this embodiment is considered to be a normally closed valve which is opened upon energization of the solenoid 57. Further, fluid pressure may be supplied to valve 2 by connecting it to compartment 9, as shown in the drawings, or it can be connected to the pressure source externally of the valve body 4. These details do not form part of the invention and detailed description thereof is believed unnecessary.

The valve member 30 comprises a first piston 31 arranged in the first control chamber 6 and sealed with respect thereto by a sealing ring 32. The piston 31 is integrally connected by a neck 33 to a first valve element 34. The first valve element 34 has an O ring 36 on its periphery and an axially projecting, annular ridge 37 on the leftward face thereof which is arranged for engaging the sealing ring 24. The O ring 36 is arranged for slidably and sealingly engaging the rightward wall portion 8a of the central opening 8 upon rightward positioning of the valve element 34. At such time compartment 27 will be isolated from compartment 13 and compartment 13 will communicate with compartment 9. In the leftward position of valve element 34, as shown in FIGURE 3, compartment 27 communicates with compartment 13 and compartment 9 is isolated from compartment 13.

A generally similar valve member 40 has a piston 41 at its leftward end which is disposed in a second chamber 7 and which has a sealing ring 42 sealingly engaging the walls of said second chamber. The piston 41 is connected integrally through a neck portion 43 to a second valve element 44, said valve element having an O ring 46 on its periphery and an axially projecting, annular ridge 47 on its rightward end face. Ridge 47 is arranged for engaging the sealing ring 23 and the O ring 46 is arranged for sealing engagement with the leftward wall portion 8b of the central opening 8. Thus, depending on the position of valve element 44, compartment 12 is placed in communication with either compartment 9 or compartment 26 and is isolated from the other thereof. The two valve members 30 and 40 are connected by a rod 48 for simultaneous movement whereby when one of the compartments 12 and 13 communicates with compartment 9 and is isolated from exhaust, the other of said compartments 12 and 13 communicates with exhaust and is isolated from compartment 9, and vice versa.

*Operation*

Considering first the condition of the apparatus in its "at rest" condition with the solenoid 57 de-energized, attention is directed to FIGURE 6. In view of the continuous communication between the inlet compartment 9 through the passageway 53 to the smaller control chamber 7, a pressure is constantly imposed upon the piston 41 and the core of the valve comprising the valve members 30 and 40 is moved rightwardly as shown in FIGURE 6. Any corresponding pressure previously existing in the control chamber 6 is exhausted through the exhaust port 58 of the valve 2. The inlet compartment 9 is connected to the cylinder port 16 for pressurizing the rightward end (as appearing in FIGURE 3) of the cylinder 18; the leftward end thereof is connected through the cylinder port 14 and the compartment 26 through the passageway 28 to the exhaust port 29.

With the energizing of the solenoid 57 and the resulting shifting of the valve 2 into its opposite position, pressure fluid will be conducted into the first control chamber 6. This moves the valve members 30 and 40 to their leftward positions as shown in FIGURES 3 and 7. Pressure fluid passes from the compartment 9 through the passageway 20 into the compartment 12 and thence out through the opening 14 to the leftward end of the cylinder 18 being controlled. Exhaust fluid from the other end of said cylinder 18 enters through the opening 16 and thence passes into the compartment 27 and out the port 29 to exhaust. Pressure from the compartment 9 is prevented from leaking into the compartment 27 by the O ring 22 and by the sealing relationship established between the annular ridge 37 and the annular seal 24, the pressure on the piston 31 being effective to urge said parts 37 and 24 into a close and satisfactory sealing relationship with respect to each other.

Upon closing the control valve 2, the valve will return to the "at rest" condition above described. In such position, the O ring 36 protects the high pressure fluid from escaping into the low pressure compartment 27 and the engagement of the annular ridge 47 with the sealing ring 23 prevents escape of high pressure fluid from within the compartment into the compartment 12.

The construction of this valve lends itself to various modifications. For example, the placement of a second solenoid valve in the line 53 will make possible the control of pressure fluid supply to the left-hand control chamber 7 in the same manner as already above described in connection with the right-hand control chamber 6. In such case said control chambers may be made of the same diameter if desired and in any case, with a constant supply of pressure fluid removed from the left-hand control chamber 7, the valve will remain in whatever position it is placed rather than tending to always return to a biased position as above described. This has certain well recognized advantages in some instances whereas the biased construction above specifically set forth in detail has other equally well understood advantages for other applications.

Although a particular preferred embodiment of the invention has been described above in detail for illustrative purposes, it will be recognized that variations or modifications of such disclosure, which lie within the scope of the appended claims, are fully contemplated.

What is claimed is:

1. A four way valve, comprising:
 a housing having an inlet port, two outlet ports and an exhaust port, said housing having coaxial control chambers at the opposite ends thereof and an intermediate valve opening coaxial with said control chambers;
 means in said housing defining a pair of compartments between said control chambers and the respective axial ends of said valve opening;
 means connecting both of said compartments to said exhaust port;
 means defining a centrally located, coaxial, high pressure zone in said valve opening and a pair of oppositely facing stationary valve seats at the opposite axial ends of said high pressure zone;
 means connecting said high pressure zone to said inlet port;
 means defining a pair of coaxial intermediate zones at the opposite axial ends of and adapted for communication with said high pressure zone and means connecting said intermediate zones to said outlet ports, respectively;
 means defining a pair of coaxial passageways at the respective axial ends of said valve opening connecting said compartments with the intermediate zone respectively adjacent thereto;
 a valve rod extending axially through said valve opening, through said compartments and into said control chambers;
 pistons mounted on the opposite ends of said valve rod and slidably received within said control chambers whereby said valve rod can be reciprocated within said housing;
 a pair of valve elements mounted on said valve rod for movement within the respective intermediate zones and the passageways adjacent thereto, each valve element including means for alternately sealingly engaging the valve seat adjacent thereto and the passageway adjacent thereto, said valve elements being related to each other such that when one is sealingly engaging its adjacent valve seat the other sealingly engages its adjacent passageway.

2. A four-way valve comprising:
 an elongated, hollow valve body having a first control chamber at one end thereof, a second control chamber at the other end thereof and an elongated intermediate valve opening longitudinally aligned with and located between said first and second control chambers, said intermediate valve opening having an enlarged central zone between its ends and a pair of enlarged end zones on opposite sides of said central zone;
 means defining a pair of exhaust compartments between the respective ends of said intermediate valve opening and said first and second control chamber;
 said valve body having a first port and passageway means connecting said compartments to said first port;

said valve body having a second port and means connecting said second port to said central zone;

said valve body having third and fourth ports and means connecting said third and fourth ports, respectively, to said end zones;

a cylindrical sleeve releasably fixedly secured to said valve body and disposed in said valve opening and extending between the adjacent ends of said end zones, said sleeve having an opening extending between the central opening of said sleeve and said central zone, said sleeve having sealing means on its periphery and located respectively between said end zones and said central zone to prevent flow of fluid therebetween around the periphery of said sleeve, the opposite axial end faces of said sleeve having sealing rings mounted therein;

a valve rod extending through the central opening in said sleeve, thence through said end zones and said compartments into said control chambers;

a first valve member mounted on one end of said rod and comprising a first piston located in and slidable within said first control chamber and a first valve element adapted to move between a position inside of one of said end zones and a position disposed within and sealingly contacting the wall of said valve opening between said one end zone and the adjacent exhaust compartment, said first valve element having an axially projecting annular ridge on the inner axial face thereof for sealingly engaging the sealing ring on the adjacent axial end of said sleeve when said valve element is disposed inside of said one end zone, said one end zone being in communication with the adjacent exhaust compartment when said valve element is disposed inside of said one end zone;

a second valve member mounted on the other end of said rod and comprising a second piston located in and slidable within said second control chamber and a second valve element adapted to move between a position inside of the other of said end zones and a position sealingly contacting the wall of said valve opening between said other end zone and the adjacent exhaust compartment, said second valve element having an axially projecting annular ridge on the inner axial face thereof for sealingly engaging the sealing ring on the adjacent axial end of said sleeve when said valve element is disposed inside of said other end zone, said other end zone being in communication with the adjacent exhaust compartment when said valve element is disposed inside of said other end zone; and means for supplying fluid pressure to said control chambers to effect movement of said valve rod, said valve members being positioned on said rod such that when the ridge on one of said valve elements sealingly engages the sealing ring on the adjacent axial end of said sleeve, the other valve element sealingly contacts the wall of said valve opening between the other end zone and the adjacent exhaust compartment.

References Cited in the file of this patent
UNITED STATES PATENTS

| | | |
|---|---|---|
| 1,921,092 | Newton | Aug. 8, 1933 |
| 2,624,585 | Churchill | Jan. 6, 1953 |
| 2,641,281 | Phillips | June 9, 1953 |
| 2,650,609 | Herbst | Sept. 1, 1953 |
| 2,739,613 | Kulikoff | Mar. 27, 1956 |
| 2,775,982 | Canfield | Jan. 1, 1957 |
| 2,898,936 | Collins et al. | Aug. 11, 1959 |
| 2,971,090 | Piet et al. | Feb. 7, 1961 |
| 3,016,065 | Stampfli | Jan. 9, 1962 |
| 3,017,901 | Hicks | Jan. 23, 1962 |